US010825333B2

(12) United States Patent
Harris et al.

(10) Patent No.: US 10,825,333 B2
(45) Date of Patent: Nov. 3, 2020

(54) ELECTROCHROMIC DEVICE FOR SAFETY DETECTOR

(71) Applicant: Carrier Corporation, Palm Beach Gardens, FL (US)

(72) Inventors: Peter R. Harris, West Hartford, CT (US); Marcin Piech, East Hampton, CT (US); Jose L. Santana, Andover, CT (US)

(73) Assignee: CARRIER CORPORATION, Palm Beach Gardens, FL (US)

(*) Notice: Subject to any disclaimer, the term of this patent is extended or adjusted under 35 U.S.C. 154(b) by 0 days.

(21) Appl. No.: 16/249,426

(22) Filed: Jan. 16, 2019

(65) Prior Publication Data

US 2019/0221108 A1 Jul. 18, 2019

Related U.S. Application Data

(60) Provisional application No. 62/618,918, filed on Jan. 18, 2018.

(51) Int. Cl.

| | |
|---|---|
| ***H01M 10/48*** | (2006.01) |
| ***G08B 29/04*** | (2006.01) |
| ***G08B 29/18*** | (2006.01) |
| *G08B 21/14* | (2006.01) |
| *G08B 17/10* | (2006.01) |

(52) U.S. Cl.

CPC ......... *G08B 29/043* (2013.01); *G08B 29/181* (2013.01); *G08B 17/10* (2013.01); *G08B 21/14* (2013.01)

(58) Field of Classification Search

CPC ....... G08B 29/043; G08B 17/10; G08B 21/14
See application file for complete search history.

(56) References Cited

U.S. PATENT DOCUMENTS

| | | | | |
|---|---|---|---|---|
| 4,006,585 A | | 2/1977 | Tamaru et al. | |
| 4,030,086 A | | 6/1977 | Salem | |
| 4,160,241 A | * | 7/1979 | Shimizu | G02F 1/163 345/204 |
| 5,418,085 A | | 5/1995 | Huhndorff et al. | |
| 5,458,992 A | * | 10/1995 | Bailey | G01R 13/403 429/93 |
| 5,574,436 A | | 11/1996 | Sisselman et al. | |
| 5,646,598 A | | 7/1997 | Nickles et al. | |
| 5,686,896 A | | 11/1997 | Bergman | |
| 5,737,114 A | | 4/1998 | Bailey | |

(Continued)

FOREIGN PATENT DOCUMENTS

| | | |
|---|---|---|
| EP | 0495636 B1 | 1/1992 |
| EP | 0605599 B1 | 7/1998 |

(Continued)

OTHER PUBLICATIONS

European Search Report for application EP 19151994.1, dated Jun. 1, 2019, 94 pages.

*Primary Examiner* — Munear T Akki
(74) *Attorney, Agent, or Firm* — Cantor Colburn LLP

(57) ABSTRACT

A detector for detecting a hazardous safety condition. The detector includes a housing, an electrochromic material disposed within the housing, and a power source in operative electrical communication with the electrochromic material, the electrochromic material providing a visual display to indicate a condition of the detector.

15 Claims, 2 Drawing Sheets

(56) References Cited

U.S. PATENT DOCUMENTS

| | | | | |
|---|---|---|---|---|
| 6,054,234 | A | 4/2000 | Weiss et al. | |
| 8,054,188 | B2 | 11/2011 | Harkins et al. | |
| 9,057,631 | B2 | 6/2015 | Newton | |
| 9,424,797 | B1 * | 8/2016 | Sandock | G09G 3/38 |
| 2014/0028461 | A1 * | 1/2014 | Newton | G01D 13/22<br>340/815.78 |
| 2015/0162649 | A1 * | 6/2015 | Bae | H01M 10/484<br>429/91 |
| 2015/0187234 | A1 | 7/2015 | Atkinson et al. | |
| 2017/0135408 | A1 * | 5/2017 | Cameron | A24F 47/008 |
| 2017/0331308 | A1 | 11/2017 | Blackwell et al. | |

FOREIGN PATENT DOCUMENTS

| | | | |
|---|---|---|---|
| EP | 2068288 | A1 | 6/2009 |
| EP | 2264646 | A1 | 12/2010 |
| EP | 2747047 | A1 | 6/2014 |

* cited by examiner

ELECTROCHROMIC DEVICE FOR SAFETY DETECTOR

CROSS-REFERENCE TO RELATED APPLICATIONS

This application claims the benefit of U.S. Provisional Application No. 62/618,918 filed Jan. 18, 2018, which is incorporated herein by reference in its entirety.

BACKGROUND

This disclosure relates generally to smoke and/or carbon monoxide detectors and, more particularly, to an electrochromic device for use with such detectors.

The ability to detect the presence of fire, smoke, and/or carbon monoxide provides for the safety of occupants and property. Devices relied upon to detect such risk conditions may be generically referred to herein simply as "detectors." Such detectors typically indicate a state or condition with audible sounds (e.g., beeps or voice messages) and/or flashing or persistent lights (e.g., LEDs). In an environment equipped with multiple alarms, relying on audible beeps makes tracking down the identity of a single detector with a low batter chirp is quite difficult. Optical indicators can be challenging to interpret as to the condition they indicate and require constant power for illumination. It is possible for an end of life detector to beep and/or flash until its battery is fully exhausted, at which point it has no way to indicate it has reached an end of life state.

BRIEF SUMMARY

Disclosed is a detector for detecting a hazardous safety condition. The detector includes a housing, an electrochromic material disposed within the housing, and a power source in operative electrical communication with the electrochromic material, the electrochromic material providing a visual display to indicate a condition of the detector.

In addition to one or more of the features described above, or as an alternative, further embodiments may include that the power source is in operative electrical communication with the electrochromic material with at least one electrode.

In addition to one or more of the features described above, or as an alternative, further embodiments may include that the at least one electrode comprises a first electrode and a second electrode, the first and second electrodes disposed adjacent the electrochromic material on opposing sides of the electrochromic material.

In addition to one or more of the features described above, or as an alternative, further embodiments may include that the at least one electrode is in electrical communication with the power source.

In addition to one or more of the features described above, or as an alternative, further embodiments may include that the power source is a lithium ion battery.

In addition to one or more of the features described above, or as an alternative, further embodiments may include that the power source is a capacitor charged by a battery.

In addition to one or more of the features described above, or as an alternative, further embodiments may include that the power source is a battery employed to power the detector.

In addition to one or more of the features described above, or as an alternative, further embodiments may include that the visual display is at least one of a change in color, symbol, and text.

In addition to one or more of the features described above, or as an alternative, further embodiments may include that the visual display is maintained after the power source has reached an end of life condition.

In addition to one or more of the features described above, or as an alternative, further embodiments may include that the condition of the detector is an end of life battery condition.

In addition to one or more of the features described above, or as an alternative, further embodiments may include that the electrochromic material provides a plurality of visual displays indicative of a plurality of conditions of the detector.

In addition to one or more of the features described above, or as an alternative, further embodiments may include that the electrochromic material is one of a plurality of electrochromic materials disposed within the housing.

In addition to one or more of the features described above, or as an alternative, further embodiments may include that the electrochromic material is a polymer based material.

In addition to one or more of the features described above, or as an alternative, further embodiments may include that the detector is one of a smoke detector and a carbon monoxide detector.

Also disclosed is a method of visually displaying a condition of a detector, the detector one of a smoke detector and a carbon monoxide detector. The method includes applying an electric field across an electrochromic material disposed within a housing of the detector. The method also includes changing a visual display provided by the electrochromic material in response to application of the electric field.

In addition to one or more of the features described above, or as an alternative, further embodiments may include that the electric field is applied with a power source in operative electric communication with a pair of electrodes disposed adjacent the electrochromic material.

In addition to one or more of the features described above, or as an alternative, further embodiments may include maintaining the visual display after the power source has reached an end of life condition.

In addition to one or more of the features described above, or as an alternative, further embodiments may include powering the detector with the power source.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1:
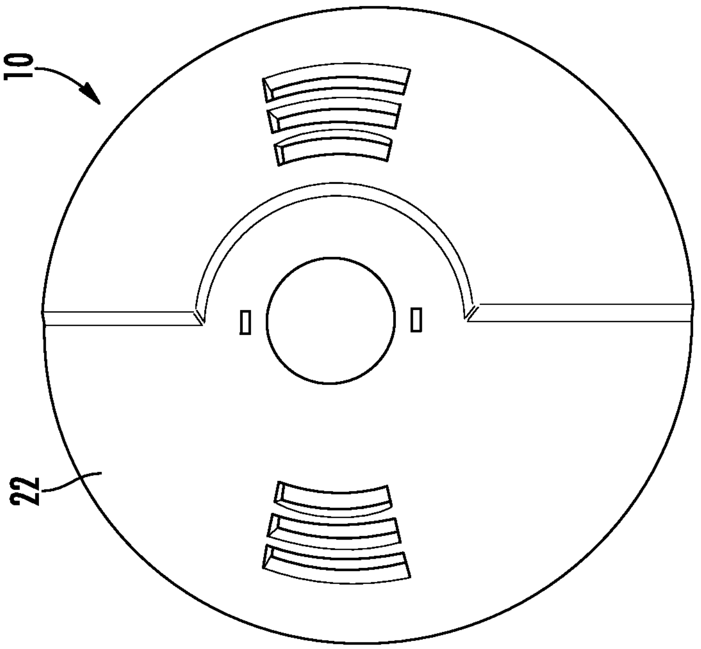
FIG. 1 is a top view of a smoke and/or carbon monoxide detector.

FIG. 1 is a safety condition detector and is generally referenced with numeral 10. The detector 10 is a smoke detector in some embodiments, but it is to be appreciated that other types of detectors may benefit from the embodiments described herein. For example, a carbon monoxide detector may incorporate the embodiments described herein. In the case of a smoke detector, the detector 10 is operable to sense the presence of smoke particles and to generate or initiate an alarm signal. Regardless of the particular type of safety condition the detector 10 is configured to detect, the detector 10 may be realized as a stand-alone system or may be part of a safety monitoring system comprising a plurality of detectors.

Figure 2:
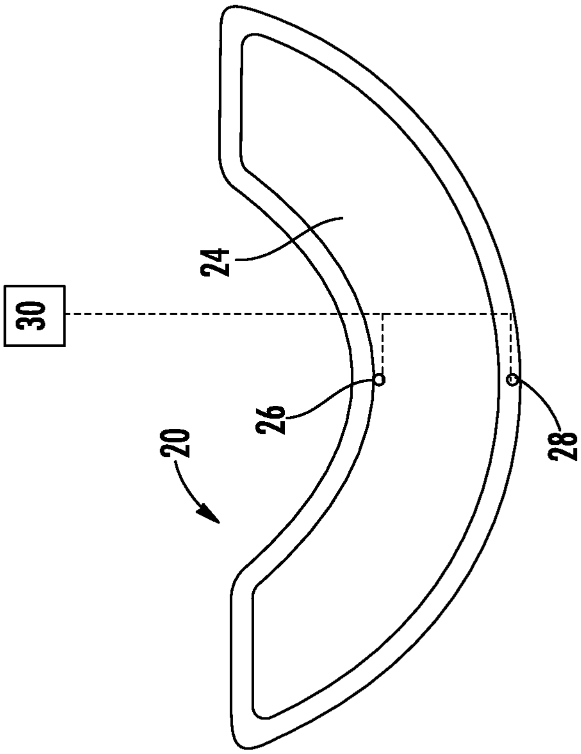
FIG. 2 illustrates an electrochromic device for use with the detector.

FIG. 2 illustrates an electrochromic device 20 for assembly in the detector 10. The electrochromic device 20 is shown as having a generally semi-cylindrical geometry, but it is to be appreciated that the illustration is merely one example of many suitable geometric configurations. Furthermore, the electrochromic device 20 can be considered as an independent flexible indicator therefore can conform to a curved surface. The precise configuration may vary depending upon the particular type of detector 10 to which it is installed. The electrochromic device 20 may be installed in any suitable location within (or on) a housing 22 (referenced in FIG. 1) of the detector 10.

The electrochromic device 20 includes an electrochromic material 24, such as those commercially available by SageGlass®, Polytronix, Inc. ™, or Sono-Tek Corp. The electrochromic material 24 is disposed proximate to a pair of electrodes, represented generally as a first electrode 26 and a second electrode 28. The electrochromic material 24 may be a polymer based material in some embodiments. The electrodes 26, 28 are located immediately adjacent to the electrochromic material 24 in the illustrated embodiment, but it is contemplated that intermediate materials or components may be located between the electrodes 26, 28 and the electrochromic material 24. In some embodiments, the electrodes 26, 28 sandwich the electrochromic material 24. The electrodes 26, 28 are in electrical communication with a power source 30. The power source 30 may be various suitable sources. For example, a lithium ion power source may be wired to the electrodes 26, 28. A capacitor may be charged by a battery which powers the detector 10, with the capacitor electrically coupled to the electrodes 26, 28 via a switch. Alternatively, the electrodes 26, 28 may be in direct electrical communication with a battery that powers the detector 10.

As described herein, the electrochromic device 20 provides a persistent visual indicator to inform an owner of at least one state of the detector 10, such as an end of life state when a power source is no longer available, for example. The visual indicator of the electrochromic device 20 is activated or changed in response to an application of an electric field across the electrochromic material 24 by the electrodes 26, 28. The application of the electric field is initiated in response to a transition of states of the detector 10. The electric field actuates a display change in the electrochromic material 24. The display change may be represented by a color change. The color change may be from a clear state of the electrochromic material to a visible color, or vice versa. Additionally, the color change may be from one visible color to another visible color. In addition, the display change may include provision of a symbol or text that is indicative of a state of the detector 10.

The transitions between the above-described visual displays occur as a result of a low voltage change detected by the electrodes 26, 28. In particular, as the power level provided by the power source 30 changes (i.e., current and/or voltage) a certain amount, the electrodes 26, 28 apply the electric field that actuates the visual display change. Due to the properties of the electrochromic material 24, the visual display change occurs at a low power, but the visual display remains in the transitioned state without any further power consumption. Therefore, if a battery level of the detector 10 is low or fully exhausted, a sustainable visual display associated with the battery level may be provided for identification by a user. Such a persistent visual display is more readily identifiable by a user when compared to an indicator that turns off once the power source is exhausted. The visual display change(s) may be reversible, such that once battery replacement is performed, the visual display returns to the original state.

In some embodiments, a single electrochromic device 20 is utilized. It is contemplated that a single electrochromic device 20 may include a single electrochromic material. In such embodiments, the single electrochromic material may be utilized to switch between two different states represented by two different visual indicators, one of which may be clear. In some embodiments, a single electrochromic material may include properties that facilitate indication of more than two different states of the detector 10, as represented by more than two different visual displays. Alternatively, multiple electrochromic materials may be provided in one or more electrochromic devices to achieve indication of multiple states of the detector 10.

Figure 3:
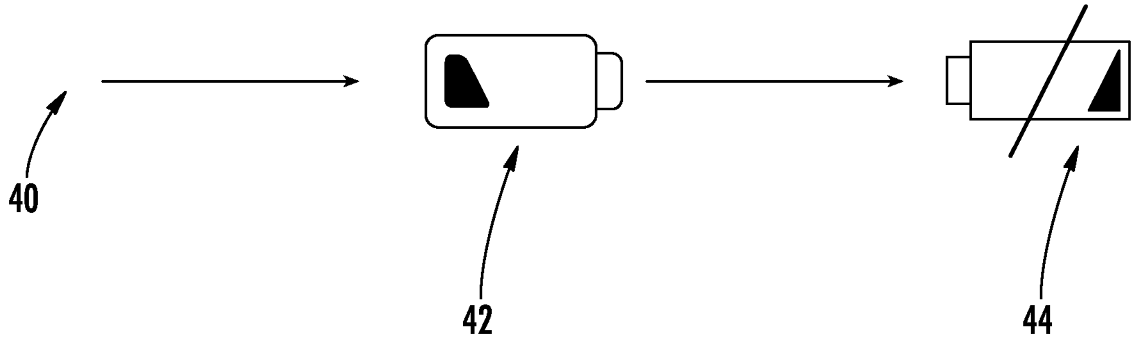
FIG. 3 is a series of visual displays provided by the electrochromic device.

By way of example of more than two states being represented, one or more electrochromic materials may have a first visual display indicating a normal state of operation of the battery of the detector 10, a second visual display may indicate a low level of the battery, and a third visual display may indicate an end of life state of the battery, such that no power remains. FIG. 3 illustrates examples of indicators for a transition from a normal operating condition with a clear indicator 40 to a low battery level condition 42 and to an end of life condition 44 of the battery. These are merely examples and it is to be appreciated that alternative symbols may be used, only colors may be used, or text may be used. Additionally, some combination of symbols, colors or text may be used. For example, a yellow indicator may indicate the low battery level and a red indicator may indicate the end of life state. Therefore, the embodiments described herein allow for a high degree of customization, as the electrochromic device 20 can be configured to provide shapes, text, and colors in any combination thereof.

As described herein, the visual display transitions are actuated by a power change, such as a voltage change provided to the electrodes 26, 28. In some embodiments, the voltage change required for device operation are +/−2V, however, the electrochromic device 20 can operate at any voltage in between that allows for control of color intensity.

The embodiments described herein provide a clear, user friendly indication of a detector state by utilizing a low power, persistent visual device. The electrochromic device 20 facilitates customization of functionally identical products. Also, the embodiments reduce the nuisance of tracking down a low battery "chirp" or not having any visual indicator after complete battery failure.

Embodiments may be implemented using one or more technologies. In some embodiments, an apparatus or system may include one or more processors, and memory storing instructions that, when executed by the one or more processors, cause the apparatus or system to perform one or more methodological acts as described herein. Various mechanical components known to those of skill in the art may be used in some embodiments.

Embodiments may be implemented as one or more apparatuses, systems, and/or methods. In some embodiments, instructions may be stored on one or more computer program products or computer-readable media, such as a transitory and/or non-transitory computer-readable medium. The instructions, when executed, may cause an entity (e.g., a processor, apparatus or system) to perform one or more methodological acts as described herein.

While the disclosure has been described in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the scope of the disclosure. Additionally, while various embodiments have been described, it is to be understood that aspects of the disclosure may include only some of the described embodiments. Accordingly, the disclosure is not to be seen as limited by the foregoing description, but is only limited by the scope of the appended claims.

What is claimed is:

1. A detector for detecting a hazardous safety condition, the detector comprising at least one of a fire detector, a smoke detector and a carbon monoxide detector, the detector comprising:

a housing;

an electrochromic material disposed within the housing of the detector; and a power source in operative electrical communication with the electrochromic material, the electrochromic material providing a visual display to indicate a condition of the power source;

wherein the visual display is visible from outside the housing;

wherein the visual display is maintained displaying the indication condition of the power source after the power source has reached an end of life condition;

wherein the power source comprises a capacitor charged by a battery.

2. The detector of claim 1, wherein the power source is in operative electrical communication with the electrochromic material with at least one electrode.

3. The detector of claim 2, wherein the at least one electrode comprises a first electrode and a second electrode, the first and second electrodes disposed adjacent the electrochromic material on opposing sides of the electrochromic material.

4. The detector of claim 2, wherein the at least one electrode is in electrical communication with the power source.

5. The detector of claim 3, wherein the capacitor is electrically coupled to the first electrode and the second electrode.

6. The detector of claim 1, wherein the visual display is at least one of a change in color, symbol, and text.

7. The detector of claim 1, wherein the electrochromic material provides a plurality of visual displays indicative of a plurality of conditions of the detector.

8. The detector of claim 1, wherein the electrochromic material is one of a plurality of electrochromic materials disposed within the housing.

9. The detector of claim 1, wherein the electrochromic material is a polymer based material.

10. The detector of claim 1, wherein the detector is one of a smoke detector and a carbon monoxide detector.

11. A method of visually displaying a condition of a detector, the detector comprising at least one of a fire detector, a smoke detector and a carbon monoxide detector, the method comprising:

powering the detector with a power source;

applying an electric field across an electrochromic material disposed within a housing of the detector;

changing a visual display provided by the electrochromic material in response to application of the electric field; and maintaining the visual display displaying an indication condition of the power source after the power source has reached an end of life condition;

wherein the power source comprises a capacitor charged by a battery.

12. The method of claim 11, wherein the electric field is applied with the power source in operative electric communication with a pair of electrodes disposed adjacent the electrochromic material.

13. The detector of claim 1, wherein the capacitor powers the detector.

14. The detector of claim 2, wherein the capacitor is electrically coupled to the at least one electrode.

15. The detector of claim 14, wherein the capacitor is electrically coupled to the at least one electrode by a switch.

* * * * *